United States Patent [19]

Leigh-Monstevens

[11] Patent Number: 4,959,188
[45] Date of Patent: Sep. 25, 1990

[54] METHOD FOR FORMING A HYDRAULIC CYLINDER ASSEMBLY

[75] Inventor: Keith V. Leigh-Monstevens, Troy, Mich.

[73] Assignee: Automotive Products plc, Warwickshire, England

[21] Appl. No.: 380,764

[22] Filed: Jul. 17, 1989

Related U.S. Application Data

[63] Continuation of Ser. No. 177,313, Apr. 4, 1988, abandoned.

[51] Int. Cl.$^5$ .................. B29C 41/20; B29C 45/14
[52] U.S. Cl. .................... 264/255; 264/279; 92/170.1
[58] Field of Search .................. 264/250, 255; 92/170

[56] References Cited

U.S. PATENT DOCUMENTS

| | | | |
|---|---|---|---|
| 3,040,712 | 6/1962 | Harrah | 92/170 |
| 3,059,586 | 10/1962 | Brailsford | 92/170 |
| 3,082,485 | 3/1963 | Thomas | 264/255 |
| 3,123,080 | 3/1964 | Sisson | 92/170 |
| 3,192,298 | 6/1965 | Fisher | 264/255 |
| 3,218,383 | 11/1965 | White | 264/255 |
| 3,607,494 | 9/1971 | Rowland | 264/255 |
| 3,917,789 | 11/1975 | Heisler | 264/255 |
| 3,992,503 | 11/1976 | Henfrey | 264/255 |
| 4,067,093 | 1/1978 | Schumacher | 264/274 |
| 4,207,807 | 6/1980 | Takata | 92/170 |
| 4,214,507 | 7/1980 | Hock | 264/250 |
| 4,268,237 | 5/1981 | Wolters | 264/255 |
| 4,269,802 | 5/1981 | Linne | 264/255 |
| 4,348,348 | 9/1982 | Bennett | 264/255 |
| 4,410,479 | 10/1983 | Cyriax | 264/255 |
| 4,452,128 | 6/1984 | Stoll | 92/170 |
| 4,459,256 | 7/1984 | Ziegler | 264/255 |
| 4,485,065 | 11/1984 | Hatakeyama | 264/267 |
| 4,507,258 | 3/1985 | Aoki | 264/250 |
| 4,527,395 | 7/1985 | Gaiser | 92/170 |
| 4,592,886 | 6/1986 | Mannherz | 264/255 |
| 4,630,345 | 12/1986 | Lutz | 264/259 |
| 4,667,780 | 5/1987 | Pavliukonis | 92/170 |
| 4,743,422 | 5/1988 | Kalriis-Nielson | 264/255 |

FOREIGN PATENT DOCUMENTS

| | | |
|---|---|---|
| 0185165 | 6/1986 | European Pat. Off. . |
| 3044851 | 7/1982 | Fed. Rep. of Germany ...... 264/255 |
| 1422935 | 11/1964 | France . |
| 2386411 | 12/1978 | France ................. 264/255 |
| 0118845 | 9/1980 | Japan ................. 264/255 |
| 59-23759 | 2/1984 | Japan . |
| 2169046 | 7/1986 | United Kingdom . |

*Primary Examiner*—Jay H. Woo
*Assistant Examiner*—Jeremiah F. Durkin, II
*Attorney, Agent, or Firm*—Krass and Young

[57] ABSTRACT

A method of forming a hydraulic cylinder assembly utilizing a plastic material for the cylinder body. The method includes forming the cylinder body in a first molding operation and simultaneously molding one or more external walls on the exterior of the cylinder body having an axial thickness less than the axial thickness of the walls of the cylinder body and thereafter increasing the axial thickness of the exterior walls to a value substantially exceeding the thickness of the cylinder walls so as to define an appendage. Where the appendage includes a mounting flange, a small external annular wall is molded on the cylinder body during the initial molding operation having an axial thickness less than the thickness of the walls of the cylinder body and a larger flange is thereafter formed around the small flange. Where the appendage includes a reservoir, the external wall formed on the cylinder body in the initial molding operation includes an integral closed loop rim joined to the cylinder wall of the cylinder body by an annular wall having an axial thickness less than the thickness of the cylinder wall and the reservoir is thereafter provided by forming a reservoir around the rim. The steps may be performed in either order. Specifically, the reservoir or flange may be initially formed and then used as an insert in the mold cavity so that the cylinder main body, including the attaching rim or small wall portion, may be thereafter injected into the mold cavity in surrounding relation to the reservoir or flange insert.

23 Claims, 4 Drawing Sheets

FIG. 8
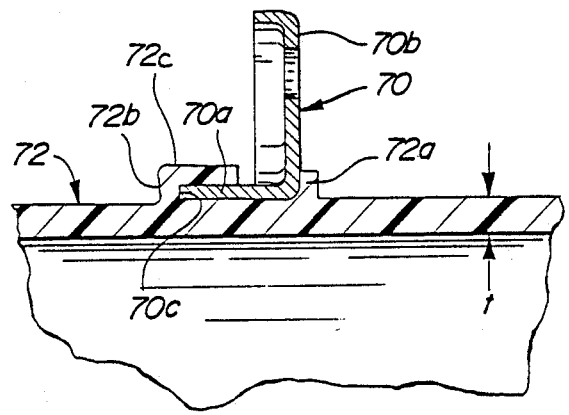
FIG. 9
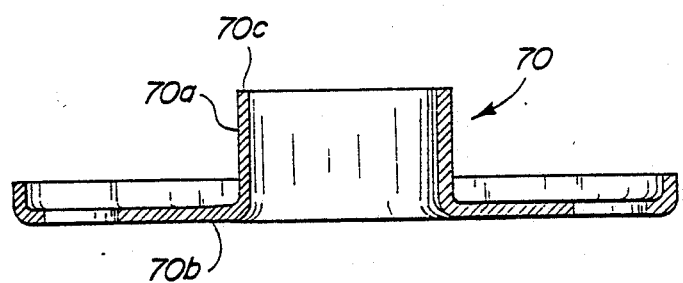
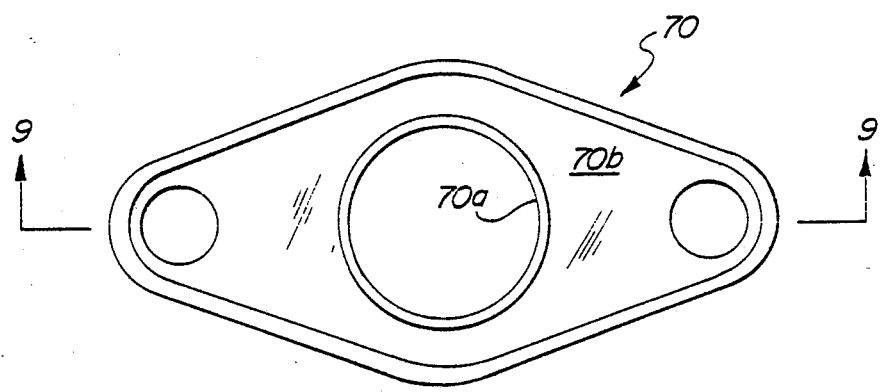
FIG. 10

METHOD FOR FORMING A HYDRAULIC CYLINDER ASSEMBLY

This is a continuation of co-pending application Ser. No. 177,313, filed on Apr. 4, 1988, now abandoned.

BACKGROUND OF THE INVENTION

This invention relates to hydraulic cylinder assemblies and more particularly to a method of forming a hydraulic cylinder assembly.

Hydraulic cylinder assemblies are in common usage. The typical assembly includes a cylindrical main body member and a piston assembly disposed within the central bore of the cylindrical main body member. Pressurized hydraulic fluid is discharged from the cylindrical main body member in response to stroking reciprocal movement of the piston assembly within the bore of the cylindrical main body. Hydraulic cylinder assemblies were originally formed primarily of metallic materials but more recently attempts have been made to form at least the cylindrical main body of the assembly out of a plastic material so as to facilitate the manufacturing process and reduce the cost of the assembly. Forming the main body cylindrical member out of plastic, while reducing cost, has the disadvantage of creating sink marks along the bore of the cylinder adjacent the locations where appendages, such as mounting flanges and reservoirs, are provided exteriorally of the cylinder body. The sink marks interfere with effective sealing as between the elastomeric seals carried by the piston assembly and the bore of the cylinder and further introduce a rocking or wobbling potential with respect to the piston assembly with resultant excessive wear of the piston assembly.

SUMMARY OF THE INVENTION

This invention is directed to the provision of an improved hydraulic cylinder assembly of the plastic type.

More specifically, this invention is directed to a method of forming a plastic cylindrical body for a hydraulic cylinder assembly in a manner to provide the necessary external appendages on the cylindrical body without creating harmful sink marks along the bore of the cylindrical body.

The invention method applies to the formation of a hydraulic cylinder assembly of the type including a main body cylinder defining a central axial bore, a piston assembly mounted for reciprocal stroking axial movement in the bore, and an external integral appendage on the main body cylinder. The invention method comprises forming the main body cylinder and the appendage in a two step operation wherein one step comprises forming the main body cylinder with a cylindrical wall thickness t while simultaneously molding an external wall on the exterior periphery of the cylinder body having an axial thickness not substantially exceeding t and the other step comprises forming an appendage having a portion sized to coact with the external walls on the cylinder body to form an external wall thickness at the juncture of the appendage with the cylinder body having a value substantially exceeding t. This multi-step molding operation has the effect of substantially eliminating any sink marks on the bore of the cylinder.

According to a further feature of the invention, the external wall formed on the cylinder body comprises an external annular flange around the cylinder body having an axial thickness not substantially exceeding t and, in a further operation, the axial thickness of the external flange is increased to a value substantially exceeding t so as to define a structurally adequate mounting flange for the hydraulic cylinder assembly.

According to a further feature of the invention, an annular metal member is molded around the cylinder body in molding juxtaposition to the external annular flange and the further operation includes molding material around the annular metal member so as to define a mounting flange of substantial dimensions and further reinforced by the annular metal member.

According to a further feature of the invention, two axially spaced external annular walls are molded on the cylinder body with each having an axial thickness not substantially exceeding t, and the annular metal member is molded around the cylinder body between the axially spaced flanges.

According to a further feature of the invention, the appendage formed on the exterior of the cylinder body comprises an integral reservoir, an integral closed loop rim is formed externally of the cylinder body simultaneously with the molding of the cylinder body with the rim joined to the cylinder wall of the cylinder body by a annular wall having an axial thickness not substantially exceeding t, and the further molding operation comprises molding a reservoir around the closed loop rim on the cylinder body including an annular mounting portion moldingly surrounding the rim on the cylinder body and an annular main body portion positioned radially outwardly from the mounting portion and defining the main body of the reservoir.

In all the disclosed invention embodiments and features, the step of molding the cylinder body may comprise the initial step in the invention process or, alternatively, the desired flange or reservoir appendage may be formed in the initial step and thereafter utilized as a mold cavity insert around which the cylinder body is thereafter molded.

BRIEF DESCRIPTION OF THE DRAWINGS

FIGS. 8–10 illustrate a still further modified form of hydraulic cylinder assembly according to the invention.

DETAILED DESCRIPTION OF THE PREFERRED EMBODIMENTS

Figure 1:
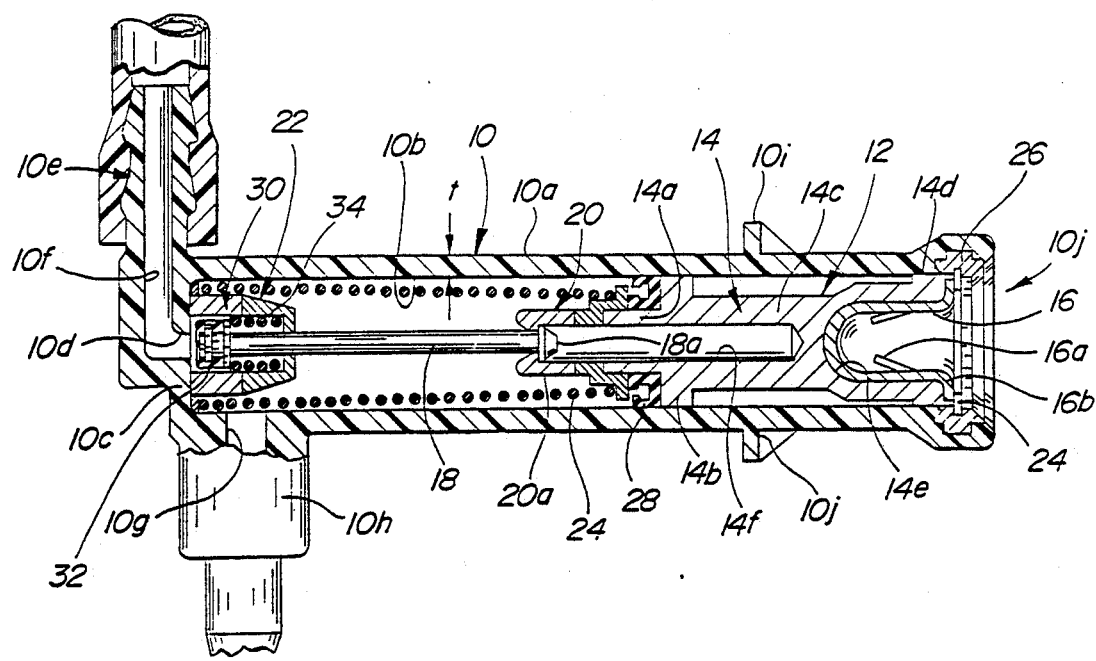
FIG. 1 is a cross-sectional view of a hydraulic master cylinder assembly according to the invention following a first molding operation.

The hydraulic master cylinder assembly seen in FIG. 1 includes a cylinder body 10 and a piston assembly 12. Cylinder body 10 is preferably formed of a plastic polymer material such, for example, as a polyamide. Specifically, cylinder 10 may be formed of Nylon 6—6 with glass fiber reinforcement. Body 10 includes a cylindrical main body portion 10a defining a cylindrical axial bore 10b, an end wall 10c closing the forward end of the cylinder and defining a central reservoir port 10d, a reservoir fitting 10e defining a central reservoir passage 10f communicating at its lower end with discharge port 10d, a discharge port 10g defined by a discharge fitting 10h, and an external annular flange 10i generally adjacent the open end 10j of the cylinder body.

Piston assembly 12 includes a piston 14, a pushrod retainer 16, a valve stem 18, a valve stem retainer 20, a valving assembly 22, and a return spring 24. Piston 14 includes a nose portion 14a, a forward land portion 14b, a central spool portion 14c, and a rearward land portion 14d. Pushrod retainer 16 fits into a blind bore 14e in the rearward end of piston 14 and includes spring finger portions 16a for trapping receipt of the head of a pushrod (not shown). Retainer 16 further includes an annular rearward flange portion 16b coacting with a snap ring 24 received in an annular retainer 26 to define the retracted position of the piston in the bore 10b. Valve stem retainer 20 is fitted over the forward end of piston nose portion 14a and coacts with piston land portion 14b to define an annular groove for receipt of an annular elastomeric seal 28. Retainer 20 includes a plurality of forwardly extending finger portions 20a snappingly receiving the head portion 18a of retainer 18 with head portion 18a being free to move relative to the piston in a blind bore 14f opening at the forward end of the piston. Valving assembly 22 includes a retainer member 30 positioned in concentric relation around reservoir port 10d and passing the forward end of stem 18, an elastomeric member 32 carried on the free forward end of stem 18 for sealing coaction with reservoir port 10d and a spring 34 positioned within retainer 30.

It will be understood that the hydraulic master cylinder assembly illustrated in FIG. 1 is of the center feed type in which the piston, in its extreme retracted position, acts through the head 18a of valve stem 18 to maintain elastomeric member 32 in a position clear of reservoir port 10d so as to establish communication between the reservoir and the bore 10b and ensure that the bore 10b is totally filled with hydraulic fluid forwardly of the piston, and in which elastomeric member 32 moves into sealing engagement with reservoir port 10d upon forward stroking movement of the piston so as to block communication between bore 10b and the reservoir and ensure the discharge of pressurized fluid through discharge port 10g to the user device.

Cylinder body 10, as seen in FIG. 1, is formed in a single molding operation in which the reservoir fitting 10e, the discharge fitting 10h, and the external flange 10i are simultaneously formed. Cylinder body 10 has a cylindrical wall thickness t and flange 10i is formed with an axial wall thickness preferably equal to ¼ or ½ t and, in any event, not substantially greater than t. It is critical that the axial thickness of flange 10i not substantially exceed the thickness t of the cylinder wall since there is a high likelihood that sink marks will otherwise form along the internal periphery of bore 10b adjacent flange 10i. Flange 10i further includes several small triangular ribs 10j spaced circumferentially around the exterior of the cylinder. The ribs 10j are spaced far enough apart and are of small enough volume so as not to create a danger of sink marks on the bore of the cylinder immediately adjacent the ribs.

Figure 2:
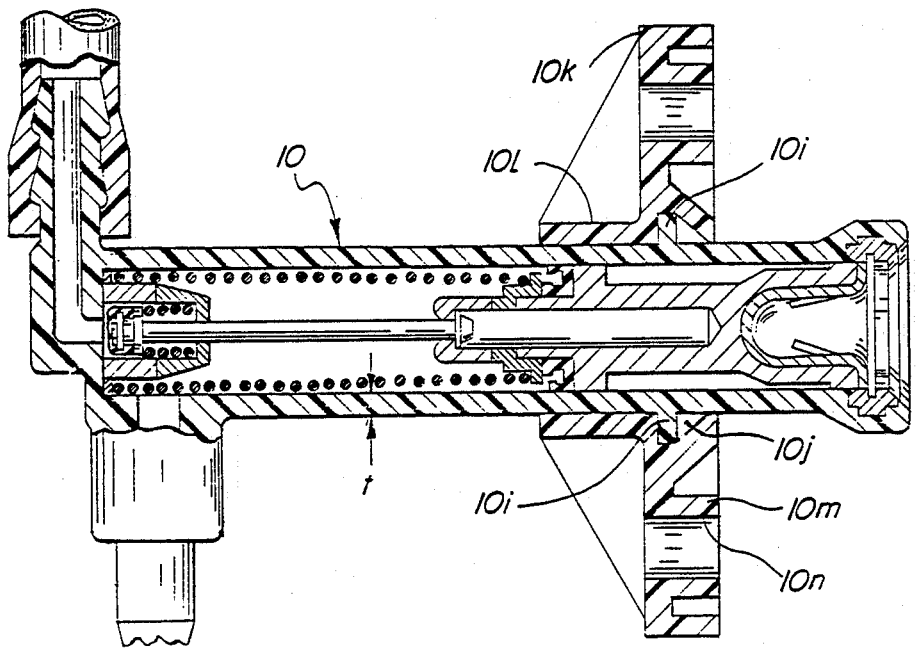
FIG. 2 is a cross-sectional view of a hydraulic master cylinder assembly according to the invention following a second molding operation.

Following the molding and cooling of the cylinder body as shown in FIG. 1, a further molding operation is performed in which a large flange 10k is molded around the small flange 10i. Specifically, as seen in FIG. 2, flange 10k includes a radially inner annular hub portion 10l having an axial dimension substantially exceeding the axial dimension of flange 10i and substantially exceeding the cylindrical wall thickness t, and further includes a radially outwardly extending annular portion 10m extending substantially radially outwardly from flange 10i and defining mounting holes 10n for receipt of suitable fasteners to secure the hydraulic cylinder assembly to a suitable mounting structure. Hub portion 10l moldingly and tightly embraces and surrounds small flange 10i so as to form a composite, unitary, integral flange structure on the external periphery of the cylinder including the small flange 10i and the large flange 10k molded thereto and therearound.

This two step molding operation allows the formation of a structurally adequate mounting flange on a plastic cylinder without creating any sink marks along the bore of the cylinder such as would interfere with the sealing action of seal 28 or such as would create wobble of the piston assembly 12 and ultimate wear of the piston assembly.

Whereas the invention has been illustrated and described in connection with FIGS. 1 and 2 as involving the formation of cylinder body 10 and small flange 10i prior to the addition of the large flange 10k, it will be apparent that the steps may be reversed. That is, the large flange 10k could be formed in a first molding operation and used as an insert in the molding body tool or mold cavity, and the cylindrical body 10 and small flange 10i could thereafter be formed by injection into the mold cavity with the large flange 10k positioned therein. It will also be understood that the invention can be carried out using a single tool or mold with twin injection heads wherein the cylinder body is formed utilizing the first injection head and the large flange is formed utilizing the second injection head, with the only requirement being that the plastic injected utilizing the first head be allowed to set up (a matter of only a few seconds) prior to the utilization of the second injection head to perform the second molding operation.

It will further be understood that annular retainer 26 is moldingly positioned within the open end 10j of the cylinder body during the molding operation in which the cylinder body is formed, and that piston assembly 12 is positioned within bore 10d following the two step invention molding operation to form the completed cylinder assembly.

Figure 3:
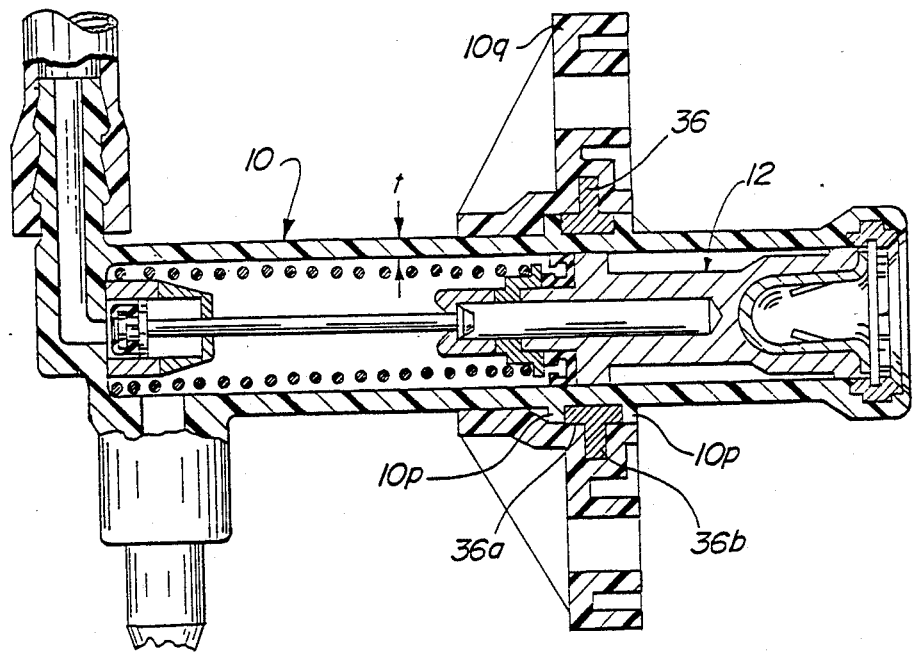
FIG. 3 is a cross-sectional view of a modified form of hydraulic master cylinder assembly according to the invention.

A further form of the invention is illustrated by the hydraulic master cylinder assembly shown in FIG. 3. The hydraulic master cylinder assembly shown in FIG. 3 is identical to the hydraulic master cylinder assembly seen in FIGS. 1 and 2 with the exception that the external mounting flange is provided by molding a pair of axially spaced external annular flanges 10b on the external periphery of the body 10 and moldingly positioning a metallic annular insert member 36 axially between the flanges 10p. In practice, member 36 would be used as an insert in the mold cavity and the body 10, including flanges 10p, would be molded around the insert to produce the configuration shown in FIG. 3, whereafter large flange portion 10q would be molded around flanges 10p and around insert 36 in a further molding operation to provide an external mounting flange having the required structural integrity for use in mounting the hydraulic cylinder assembly to an associated structure. Annular insert 36 may be formed of steel or a suitable powdered metal and includes a main body portion 36a extending axially between flanges 10p and an external rib portion 36b extending radially outwardly from the main body portion 36a and totally encased by flange 10q in the final molded configuration of the hydraulic cylinder assembly. Flanges 10p have an axial dimension less than the thickness t of the cylinder wall so as to minimize the possibility of sink marks being formed along the internal bore of the cylinder. The steel or powdered metal insert 36 has the effect of adding structural rigidity to the flange structure and further serves to resist shrinkage of the composite structure.

Figure 4:
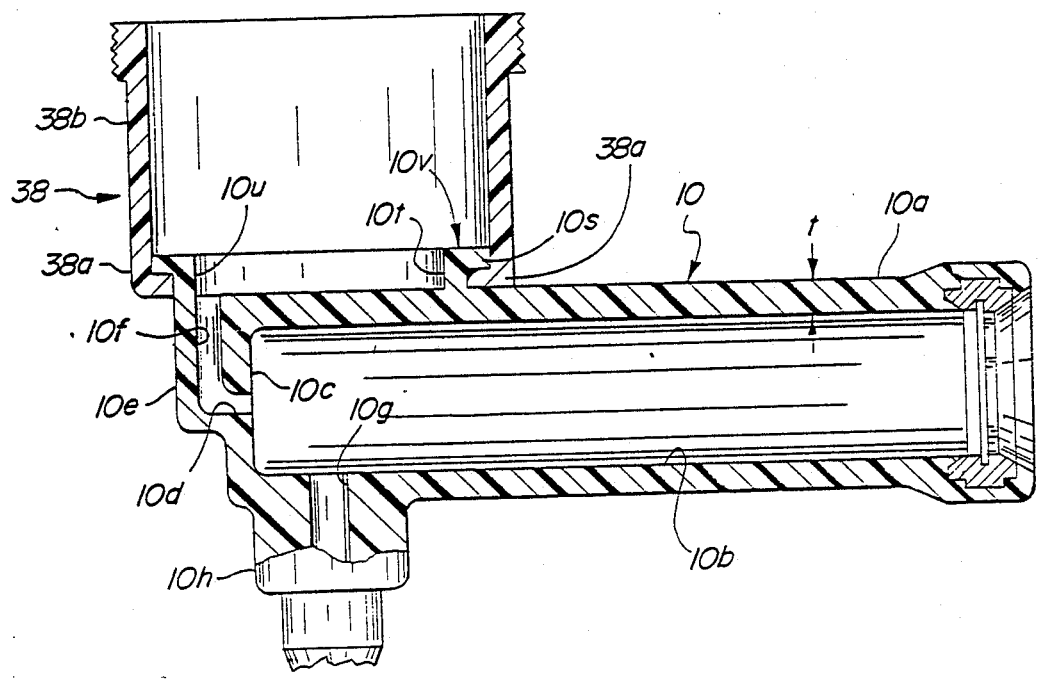
FIG. 4 is a cross-sectional view of a further modified form of hydraulic master cylinder assembly according to the invention.

The invention is seen in FIG. 4 as applied to a hydraulic master cylinder assembly of the center feed type in which a reservoir is molded integrally with the cylinder body. Although the piston assembly is not shown in FIG. 4, it will be understood that the piston assembly of FIG. 4 operates in the same manner and is constructed in the same manner as the piston assembly seen in FIGS. 1 and 2.

In the hydraulic cylinder assembly of FIG. 4, the cylinder body 10 is molded to provide the main body 10a of the cylinder having a cylindrical wall thickness t and defining a bore 10b, and an integral closed loop rim 10r, perferably of a circular configuration, is simultaneously formed integrally with the cylinder body 10 and including an annular lip portion 10s and an annular wall 10t defining an opening 10u therewithin which communicates with reservoir passage 10f. Annular wall 10t has an axial dimension or thickness that is less than the thickness t of the cylinder wall so as to minimize the danger of forming a sink along the internal bore 10b adjacent the annular wall 10t.

Following the formation of the cylinder body 10 including the integral closed loop rim 10r, a further molding operation is performed in which a reservoir 38 is molded onto the rim 10r. Reservoir 38 includes an annular mounting portion 38a surrounding cylinder body rim portion 10r and an annular main body portion 38b positioned radially outwardly from mounting portion 38a and defining the main body of the reservoir. It will be seen that cylinder mounting portion 38a moldingly and lockingly engages cylinder main body rim portion 10r to form a reservoir that is integral with respect to the cylinder body 10.

Figure 5:
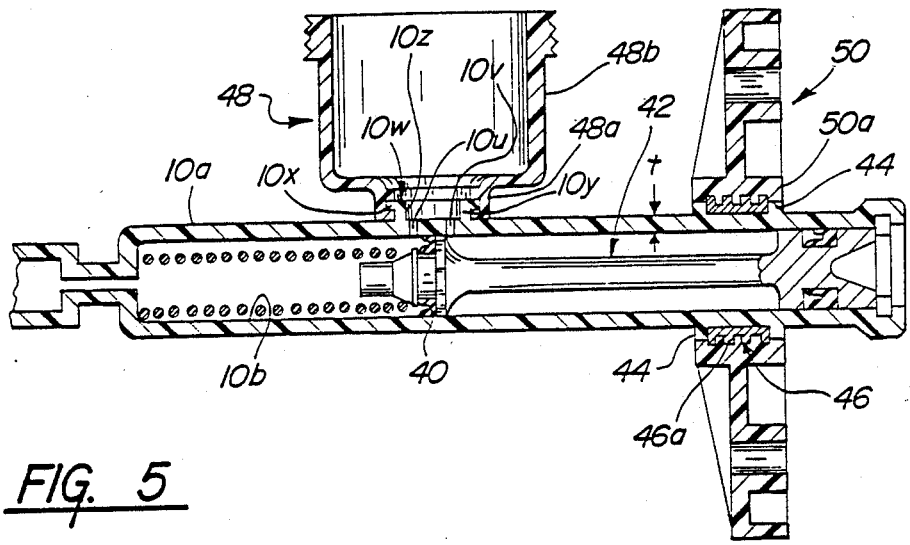
FIG. 5 is a cross-sectional view of a further modified form of hydraulic master cylinder assembly according to the invention.

The invention is seen in FIG. 5 as applied to a hydraulic master cylinder assembly of the seal over port type in which, in the completed cylinder assembly, the forward annular seal 40 carried by the piston 42 coacts in known manner with a pair of reservoir ports 10u and 10v in the wall of the cylinder body 10a to immediately seal the bore 10b of the cylinder body from the reservoir in response to forward stroking movement of the piston and to provide communication between the reservoir and the annular area behind the forward land portion of the piston in the fully retracted position of the piston.

In the invention as applied to the seal over port master cylinder assembly of FIG. 5, an integral closed loop rim 10w, preferably of a circular configuration, is formed during the molding operation in which the cylinder body 10a is formed. Rim 10w is positioned on the exterior of cylinder body 10a in surrounding relation to ports 10u and 10v and includes an annular lip portion 10x and an annular wall portion 10y defining an opening 10z therewithin communicating with ports 10u and 10v.

The axial wall thickness of annular wall 10y is less than the thickness t of the cylindrical walls of cylinder body 10a so as to minimize the possibility of sink marks being formed along the internal bore 10b of the cylinder body in the area of annular wall 10y.

A pair of axially spaced external flanges 44 are also formed on the external periphery of cylinder body 10a during the initial molding operation and an annular metallic member 46, positioned as an insert in the mold cavity prior to the injection molding of the cylinder body, is moldingly positioned between flanges 44. Flanges 44 have an axial thickness less than the wall thickness t of the cylinder body so as to minimize the possibility of sink marks being formed on the internal bore 10b of the cylinder body adjacent the flanges 44. Metallic annular member 46 includes a series of axially spaced external ribs 46a.

Following the initial molding operation to form the cylinder body 10a together with the integral reservoir rim 10w and the flanges 44 moldingly surrounding the metal insert 46, the cylinder body is subjected to a further molding operation in which a reservoir 48 is molded to rim 10w and a mounting flange 50 is molded to flanges 44 and metal insert 46. Reservoir 48 includes an annular mounting portion 48a molded in surrounding relation to rim 10w and an annular main body portion 48b positioned radially outwardly from mounting portion 48a and defining the main body of the reservoir. Flange 50 is molded in surrounding relation to flanges 44 and to metal insert 46 with the inner peripheral annular hub portion 50a of the flange 50 moldingly and interlockingly coacting with ribs 46a on insert 46 to firmly and integrally secure flange 50 to cylinder body 10a.

Figure 6:
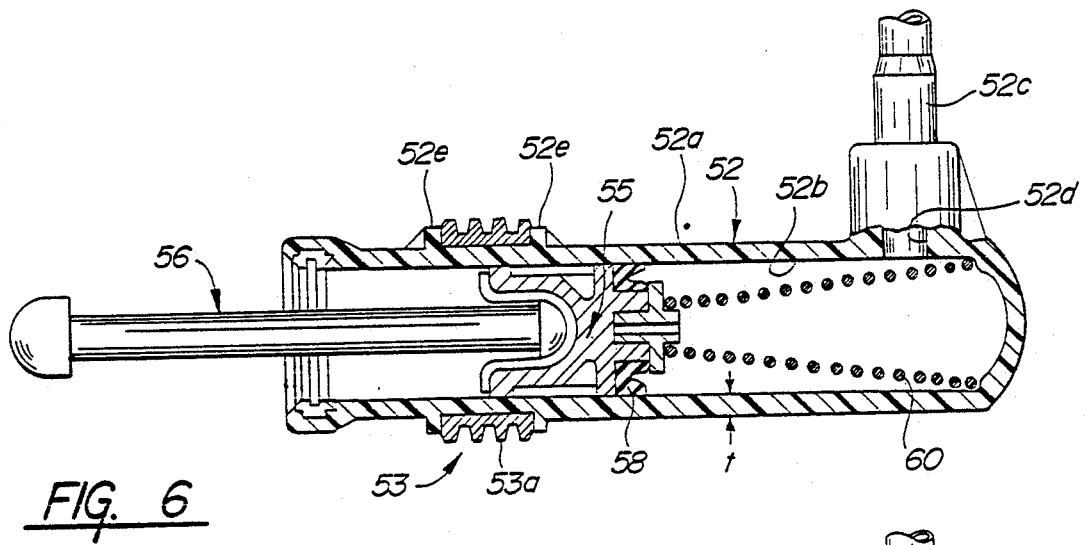
FIGS. 6 and 7 illustrate the invention as applied to the formation of a mounting flange on a hydraulic slave cylinder assembly.
Figure 7:
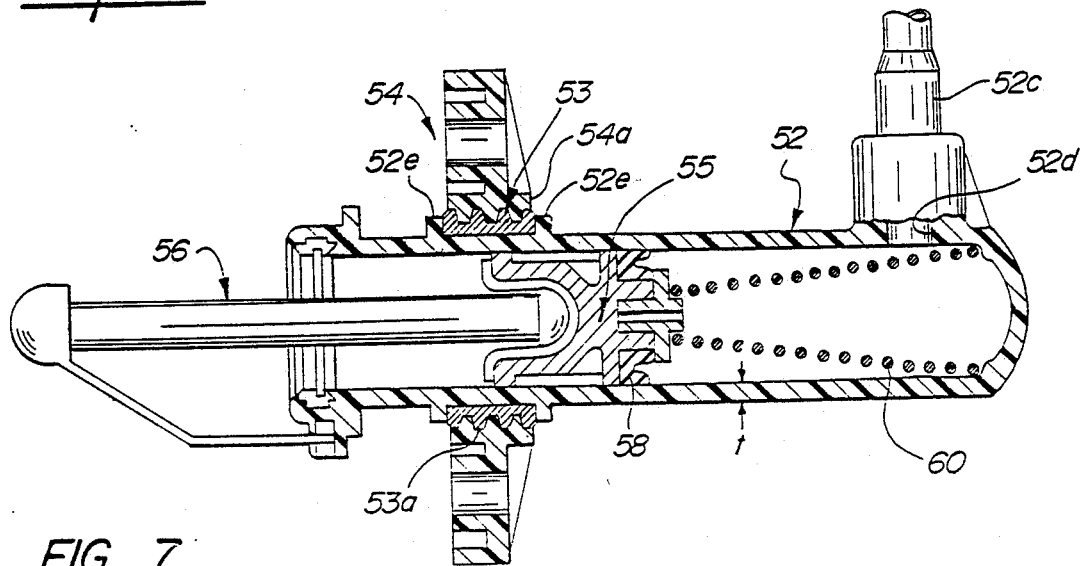

The invention is seen in FIGS. 6 and 7 as applied to a hydraulic master cylinder assembly of the slave type. The cylinder body 52 of the slave cylinder of FIGS. 6 and 7 includes a main body portion 52a defining a central bore 52b and defining cylindrical walls having a thickness t, a discharge fitting 52c defining a discharge port 52d, and a pair of axially spaced flanges 52e having an axial thickness less than the thickness t of the cylinder walls. During the initial molding of the cylinder body 52, an annular metal insert 53 is positioned in the mold cavity and the cylinder body 52 is molded around the insert so as to position the insert moldingly between flanges 52e. Insert 53 includes a series of axially spaced external ribs 53a. Following the molding of the cylinder body 52 to simultaneously form axially spaced flanges 52e moldingly embracing metal insert 62, the cylinder body is subjected to a further molding operation in which a mounting flange 54 is moldingly secured to metal insert 53 with the hub portion 54a of the flange moldingly and lockingly coacting with axial ribs 53a on metal insert 53 to integrally secure flange 54 to cylinder body 52.

The completed slave cylinder seen in FIGS. 6 and 7 further includes a piston assembly including a piston 55, a pushrod 56, a seal 58, and a return spring 60, all operating in known manner in response to entrance of pressurized hydraulic fluid through port 52d to move the piston assembly reciprocally within the bore 52b and actuate the associated control mechanism such, for example, as the clutch of a motor vehicle.

The invention is seen in FIGS. 8–10 as applied to a hydraulic cylinder assembly which may comprise a master cylinder assembly or a slave cylinder assembly. In the embodiment of FIGS. 8–10, a flange 70 is formed in a suitable stamping operation of a suitable metallic material that includes an axially extending mounting hub portion 70a and a radially outwardly extending mounting portion 70b forming an L-shaped configuration in cross section with hub portion 70a. Following formation of metal flange 70, flange 70 is positioned as an insert in a suitable mold cavity, and a cylinder body 72 is thereafter ejection molded in the mold cavity around the flange 70 to moldingly encapsulate the flange 70 and integrally secure the flange 70 to the cylinder body 72 so that the flange 70 forms a mounting flange for the cylinder body.

Specifically, in the final molded configuration of the cylinder body and mounting flange, the cylinder body includes an external annular wall or flange 72a moldingly abutting one end of flange mounting portion 70a, a further annular wall or flange portion 72b molded adjacent the free, other end 70c of flange mounting portion 70a, and an annular axially extending portion 72c formed integrally with wall portion 72b and moldingly surrounding and encapsulating the free end 70c of the flange hub portion. As with the other embodiments of the invention, the wall or flange portions 72a and 72b have an axial thickness that is not substantially greater than the axial thickness t of the wall of cylinder 72, and the combined axial extent of wall portions 72a, 72b and flange mounting portion 70a substantially exceeds the wall thickness t.

It will be understood that, in any of the disclosed invention embodiments, the appendage such as the flange or reservoir may be formed in the initial molding operation and thereafter used as an insert in the mold cavity with the cylinder body thereafter being moldingly formed around the appendage as an insert. It will further be understood that the material utilized in forming the appendage, whether it be a flange or a reservoir, may comprise the same plastic material as the material utilized to form the cylinder body, may comprise a dissimilar plastic material, or may, as seen in FIGS. 8-10, comprise a metallic material. Dissimilar plastic materials may be utilized, for example, in situations where the requirements of the cylinder body and the appendage differ significantly so as to justify or require a different plastic material. As one example, with reference to the embodiments involving the formation of a mounting flange as an appendage to the cylinder body, the cylinder body may be formed of Nylon 6-6 with 33-43% glass reinforced fiber and the mounting flange may be formed as Nylon 6-6 with 43-60% glass reinforced fiber. In any event, it will be understood that the invention allows dissimilar materials to be utilized, where desired, to address the dissimilar requirements of the different portions of the hydraulic assembly.

The invention will be seen to provide a method of forming a hydraulic cylinder assembly utilizing the relatively inexpensive and readily formable plastic material without incurring the disadvantage of forming sink marks in the areas of the cylinder body adjacent major appendages to the cylinder body such as the mounting flange and the reservoir.

Whereas preferred embodiments of the invention have been illustrated and described in detail, it will be apparent that various changes may be made in the disclosed embodiments without departing from the scope or spirit of the invention.

I claim:

1. A method of forming a hydraulic cylinder assembly of the type including a main body cylinder defining a central axial bore, a piston assembly mounted for reciprocal stroking axial movement in the bore and an external integral appendage on said main body cylinder, said method comprising:
   (A) forming said main body cylinder with a cylindrical wall having a radial thickness t and an axial length l while simultaneously forming an external wall on the exterior periphery of said cylindrical wall extending totally around the circumference of said cylindrical wall and extending radially outwardly from said exterior periphery and having an axial thickness substantially less than l and not substantially exceeding t; and
   (B) forming an appendage and securing said appendage to said external wall in a molding operation to form an external axial wall thickness at the juncture of said appendage with said cylinder body having a value substantially less than l and substantially exceeding t.

2. A method according to claim 1 wherein said appendage i an annular external mounting flange on said cylinder body.

3. A method according to claim 1 wherein appendage is an internal reservoir.

4. A method according to claim 1 wherein said main body forming step is performed prior to said appendage forming step.

5. A method according to claim 1 wherein said appendage forming step is performed prior to said main body forming step.

6. A method according to claim 1 wherein both of said forming steps comprise molding steps and said cylinder and appendage are formed of a plastic material.

7. A method according to claim 6 wherein:
   (C) said main body molding step further includes positioning an annular metal member around said cylinder body in juxtaposition to said external wall; and
   (D) said appendage molding step further includes molding plastic material around said annular metal member.

8. A method according to claim 1 wherein
   (C) said main body forming step is a molding step carried out using a first plastic material; and
   (D) said appendage forming step is a molding step carried out using a second different plastic material.

9. A method of forming a hydraulic cylinder assembly having a plastic cylinder body defining a central axis bore and an integral external annular mounting flange, said method comprising:
   (A) molding said plastic cylinder body with a cylindrical wall having a radial thickness t and an axial length l while simultaneously molding an external wall around said cylindrical wall extending totally around the circumference of said cylindrical wall and having an axial thickness substantially less than l and not substantially succeeding t; and
   (B) forming an annular mounting flange having a central annular portion sized to coact with said external wall on said cylinder body and securing said central annular portion to said external wall in a molding operation to form an external axial wall thickness at the juncture of said mounting flange with said cylinder body having a value substantially less than l and substantially exceeding t.

10. A method according to claim 9 wherein:

(C) said body molding step further includes positioning an annular metal member around said cylinder body in molding juxtaposition to said external annular wall; and (D) said flange forming step is a plastic molding step and includes molding plastic material around said annular metal member.

11. A method according to claim 10 wherein:

(E) said body molding step includes forming two axially spaced external annular walls on said cylinder body, each having an axial thickness not substantially exceeding t, and molding said annular metal member around said cylinder body between said axially spaced walls.

12. A method according to claim 11 wherein:

(F) said annular metal member includes an annular main body portion extending axially between said axially spaced walls and an annular external rib portion extending radially outwardly from said main body portion; and (G) said flange forming step includes molding plastic material around and radially outwardly of said rib portion.

13. A method according to claim 12 wherein:

(F) a plurality of annular external ribs are provided in axially spaced relation on said main body portion of said annular metal member.

14. A method according to claim 9 wherein said body molding step is performed prior to said flange forming step.

15. A method according to claim 9 wherein said flange forming step is performed prior to said body molding step.

16. A method of forming a hydraulic cylinder assembly having a plastic cylinder body having a central axial bore and an integral reservoir communicating with said bore, said method comprising:

(A) molding said plastic cylinder body with a cylindrical wall defining a cylinder bore and having a radial thickness t and an axial length l while simultaneously molding a reservoir passage in said cylinder body opening at its inner end in said cylinder bore and opening at its outer end externally of said cylindrical wall and an integral closed loop rim externally of said cylinder wall extending around said outer end of said reservoir passage and joined to the cylinder wall of said cylinder by an annular wall having an axial thickness substantially less than l and not substantially exceeding t; and (B) forming a reservoir having a main body portion defining a fluid chamber for containing hydraulic fluid for supply to said cylinder bore and an annular mounting portion surrounding a discharge opening for said fluid chamber and sized to coact with said rim to form an axial wall thickness at the juncture of said reservoir with said cylinder main body having a value substantially less than l and substantially exceeding t whereby to secure said reservoir to said cylinder body with said cylinder bore in fluid communication with said reservoir chamber through said reservoir passage.

17. The method of claim 16 wherein said body molding step is performed prior to said reservoir forming step.

18. The method of claim 16 wherein said reservoir forming step is performed prior to said one step.

19. A method according to claim 16 wherein said reservoir forming step is a molding step and said reservoir is formed of a plastic material.

20. A method according to claim 2 wherein said flange is a metal flange having an axially extending hub portion fitted around said cylinder in abutment with said external wall.

21. A method according to claim 20 wherein said metal flange is placed as an insert in a mold cavity and said cylinder body is thereafter formed in said mold cavity in molding juxtaposition to said metal flange.

22. A method according to claim 21 wherein said cylinder is formed with two axially spaced external annular walls, each having an axial thickness not substantially exceeding t, and said flange mounting portion is positioned around said cylinder between said axially spaced annular walls.

23. A method according to claim 22 wherein:

(C) said flange further includes a radially extending annular mounting portion forming an L-shaped cross-sectional configuration with said hub portion; and (D) said cylinder further includes an annular axially extending portion formed integrally with one of said external annular walls and moldingly surrounding and encapsulating the free end of said flange hub portion.

* * * * *

UNITED STATES PATENT AND TRADEMARK OFFICE
CERTIFICATE OF CORRECTION

PATENT NO. : 4,959,188

DATED : September 25, 1990

INVENTOR(S) : Keith Leigh-Monstevens

It is certified that error appears in the above-identified patent and that said Letters Patent is hereby corrected as shown below:

Column 8, Line 21, Please delete "i an" and insert -- is an --.

Column 8, Line 23 and 24, Please delete "wherein appendage is an internal" and insert -- wherein said appendage is an integral --.

Column 4, Line 14, Please delete "101 moldingly and tightly" and insert -- 101 tightly, --.

Signed and Sealed this

Seventh Day of April, 1992

Attest:

HARRY F. MANBECK, JR.

*Attesting Officer*      Commissioner of Patents and Trademarks